(12) United States Patent
Dobell et al.

(10) Patent No.: US 10,518,800 B2
(45) Date of Patent: Dec. 31, 2019

(54) MAGNETICALLY ADHERING ROBOT

(71) Applicant: Inuktun Services Ltd., Nanaimo (CA)

(72) Inventors: Colin E. Dobell, Ladysmith (CA);
Kienan J. Warder, Nanaimo (CA)

(73) Assignee: INUKTUN SERVICES LTD.,
Nanaimo, BC (CA)

( * ) Notice: Subject to any disclaimer, the term of this patent is extended or adjusted under 35 U.S.C. 154(b) by 0 days.

(21) Appl. No.: 15/946,864

(22) Filed: Apr. 6, 2018

(65) Prior Publication Data

US 2019/0016367 A1 Jan. 17, 2019

(30) Foreign Application Priority Data

Jul. 13, 2017 (CA) ...................... 2973216

(51) Int. Cl.
| | | |
|---|---|---|
| *B62D 1/24* | (2006.01) | |
| *B62D 1/28* | (2006.01) | |
| *B62D 57/024* | (2006.01) | |
| *B62D 55/04* | (2006.01) | |
| *B62D 55/065* | (2006.01) | |

(52) U.S. Cl.
CPC ............... *B62D 1/28* (2013.01); *B62D 55/04* (2013.01); *B62D 55/065* (2013.01); *B62D 57/024* (2013.01)

(58) Field of Classification Search
CPC . B62D 1/28; B62D 1/00; B62D 1/283; B62D 1/24; B62D 57/024; B62D 57/032; B62D 57/02; B62D 55/00; B62D 55/265; B62D 55/08; B62D 55/084; B62D 55/075; B62D 55/065; B62D 55/104; B62D 55/108; B62D 55/26; B62D 55/28; B62D 55/283

See application file for complete search history.

(56) References Cited

U.S. PATENT DOCUMENTS

| | | | | |
|---|---|---|---|---|
| 3,409,854 | A * | 11/1968 | Swallert | B23K 37/0264 29/81.15 |
| 3,811,320 | A * | 5/1974 | Cowell | B62D 57/00 73/633 |
| 4,678,051 | A | 7/1987 | Dugle | |
| 4,828,059 | A * | 5/1989 | Naito | B62D 55/265 180/119 |
| 4,995,320 | A * | 2/1991 | Sato | B61B 13/04 104/118 |
| 5,392,715 | A * | 2/1995 | Pelrine | F16L 55/28 104/138.2 |

(Continued)

*Primary Examiner* — James M Dolak
(74) *Attorney, Agent, or Firm* — Davis & Bujold PLLC; Michael J. Bujold

(57) ABSTRACT

A magnetically adhering robot has a body and a first travelling assembly configured to move the body in a first direction. A second travelling assembly is provided which is configured to move the body in a second direction, orthogonal to the first direction. An elevator assembly is provided which moves the second travelling assembly between a raised position and a lowered position. In the lowered position, the second travelling assembly is lower than the first travelling assembly and solely supports the body. In the raised position, the second travelling assembly is above the first travelling assembly, with the first travelling assembly solely supporting the body. At least one magnetic assembly is provided for magnetically adhering the body to the surface.

4 Claims, 7 Drawing Sheets

(56) References Cited

U.S. PATENT DOCUMENTS

| | | | | |
|---|---|---|---|---|
| 5,435,405 | A * | 7/1995 | Schempf | B08B 9/08 |
| | | | | 180/9.1 |
| 6,276,478 | B1 * | 8/2001 | Hopkins | B62D 57/024 |
| | | | | 114/222 |
| 6,672,413 | B2 * | 1/2004 | Moore | B62D 57/024 |
| | | | | 180/9.21 |
| 7,520,356 | B2 * | 4/2009 | Sadegh | B62D 49/0621 |
| | | | | 180/127 |
| 7,765,032 | B2 * | 7/2010 | Huston | B62D 55/265 |
| | | | | 180/164 |
| 7,934,575 | B2 * | 5/2011 | Waibel | B08B 1/008 |
| | | | | 180/167 |
| 9,004,200 | B2 * | 4/2015 | Ben-Tzvi | B62D 55/02 |
| | | | | 180/6.7 |
| 9,120,622 | B1 * | 9/2015 | Elazary | B25J 19/023 |
| 9,545,965 | B2 * | 1/2017 | Schlee | B60B 39/00 |
| 9,586,636 | B1 * | 3/2017 | Burmeister | B62D 57/024 |
| 9,616,948 | B2 | 4/2017 | Ben-Tzvi et al. | |
| 10,252,412 | B2 * | 4/2019 | Nguyen | B60B 19/006 |
| 10,272,961 | B2 * | 4/2019 | Wolf | B62D 55/084 |
| 10,290,380 | B2 * | 5/2019 | Morrison | G21C 17/007 |
| 10,300,596 | B2 * | 5/2019 | Kim | A47L 11/4011 |
| 10,315,715 | B2 * | 6/2019 | Beard | B62D 55/108 |
| 10,357,140 | B2 * | 7/2019 | Liu | A47L 11/38 |

* cited by examiner

MAGNETICALLY ADHERING ROBOT

FIELD

There is described a robot that magnetically adheres to metal surfaces.

BACKGROUND

U.S. Pat. No. 4,678,051 (Dugle) titled "Rectilinearly Traveling Vehicle" discloses a vehicle having a first travelling assembly configured to move a vehicle in a first direction and a second travelling assembly to move the vehicle in a second direction, orthogonal to the first direction. U.S. Pat. No. 9,616,948 (Ben-Tzivi) titled "Active Docking Mechanism for Modular and Reconfigurable Robots" teaches similar principles to those taught in the Dugle reference as applied to robots.

SUMMARY

There is provided a magnetically adhering robot which has a body and a first travelling assembly configured to move the body in a first direction. A second travelling assembly is provided which is configured to move the body in a second direction, orthogonal to the first direction. An elevator assembly is provided which moves the second travelling assembly between a raised position and a lowered position. In the lowered position, the second travelling assembly is lower than the first travelling assembly and solely supports the body. In the raised position, the second travelling assembly is above the first travelling assembly, with the first travelling assembly solely supporting the body. At least one magnetic assembly is provided for magnetically adhering the body to the surface.

It is preferred that a single magnetic assembly be provided in order to keep weight to a minimum. This is only possible when the single magnetic assembly is movable between a first position and a second position. The single magnetic assembly assumes the first position to adhere the body to a metal surface when the first travelling assembly solely supports the body. The single magnetic assembly assumes the second position to adhere the body to the metal surface when the second travelling assembly solely supports the body.

There are various ways to move the single magnetic assembly between the first position and the second position. It is preferred that a biasing force be exerted upon the single magnetic assembly by springs to maintain the single magnetic assembly in the first position. As the second travelling assembly is lowered by the elevator assembly, the second travelling assembly engages the single magnetic assembly, overcoming the biasing force of the springs to draw the single magnetic assembly into the second position.

There are various ways to configure an elevator assembly to move the second travelling assembly. One way is to use one or more shafts with an external thread profile. Each shaft is mounted for rotation. A travelling frame is provided having a bore for each shaft. Each bore has an internal thread profile that engages the external thread profile of the shaft. The travelling frame travels along the shafts in a first direction in response to clockwise rotation of the shafts and travels along the shafts in a second direction in response to counter clockwise rotation of the shafts. A drive is provided for selectively imparting a clockwise or a counter clockwise rotation to the shafts. In the description which follows four shafts have been used for maximum stability, one at each of four corners of the travelling frame.

It will be appreciated that the first travelling assembly and the second travelling assembly can take various forms. For example, each travelling assembly could be wheels, rollers or endless tracks. It will also be appreciated that the first travelling assembly and the second travelling assembly do not have to be identical. One travelling assembly could be wheels or rollers, while the other assembly has endless tracks.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
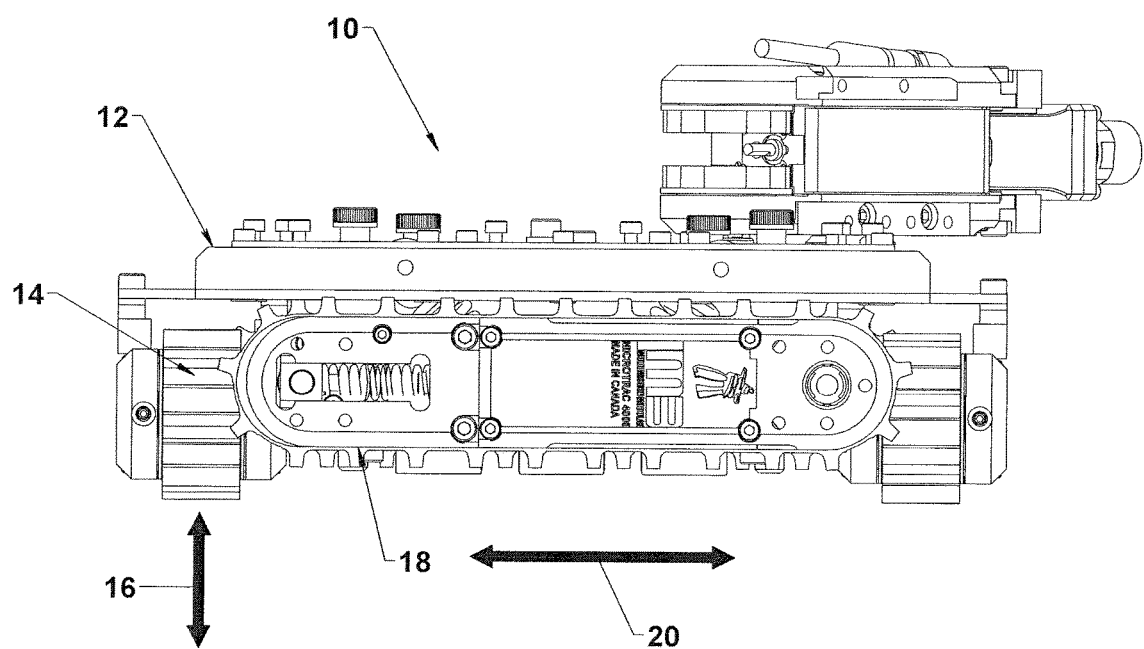
FIG. 1 is a front elevation view of a magnetically adhering robot with tracks of a first travelling assembly positioned to move the robot in a first direction.
Figure 2:
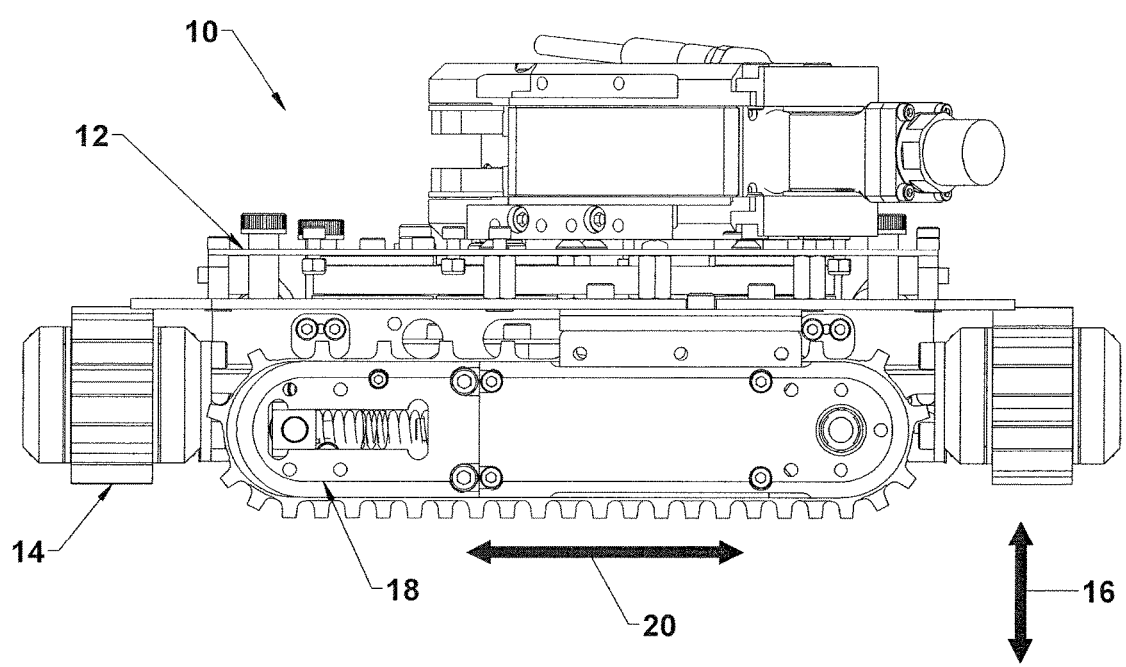
FIG. 2 is a front elevation view of the magnetically adhering robot of FIG. 1, with tracks of a second travelling assembly positioned to move the robot in a second direction.
Figure 3:
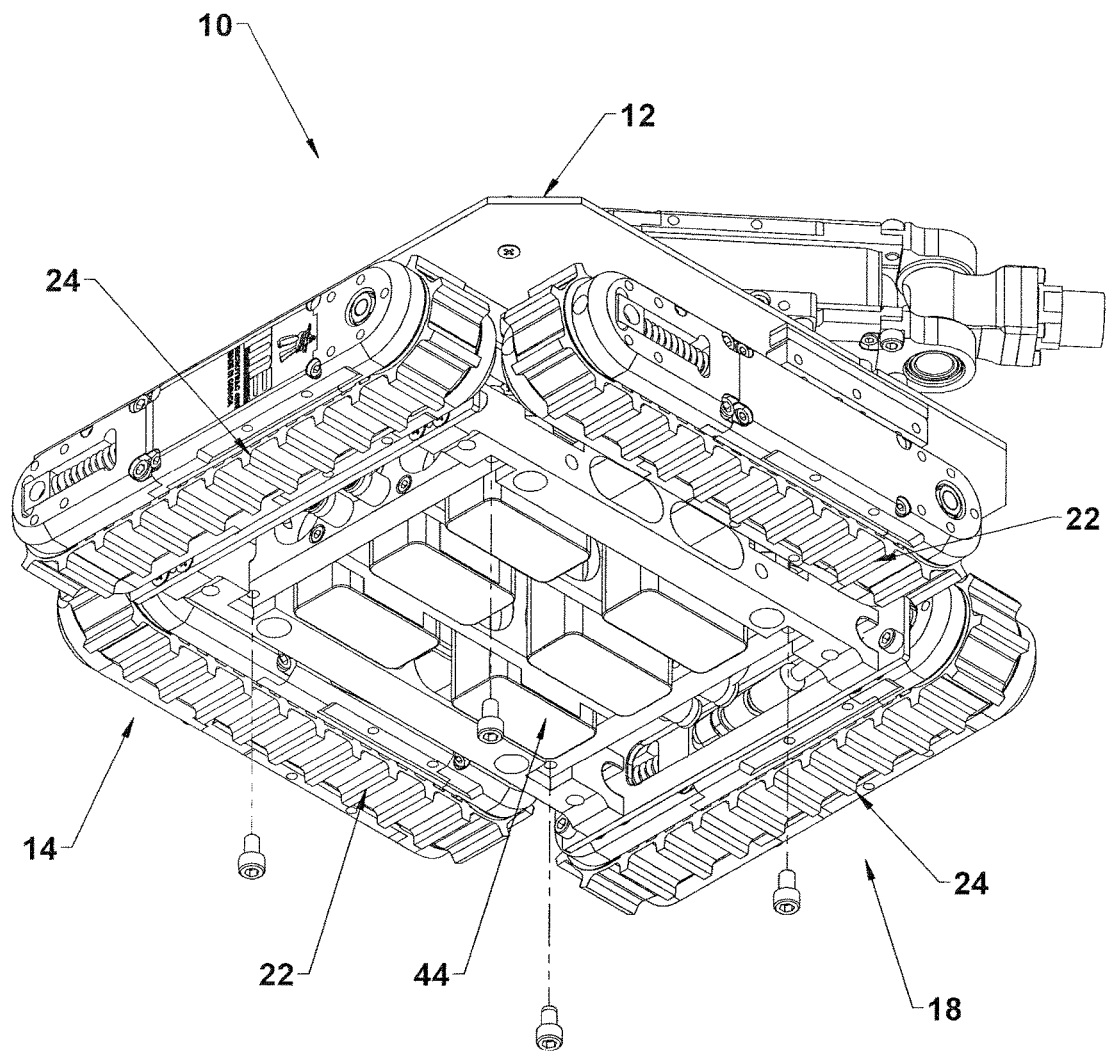
FIG. 3 is a bottom perspective view of the magnetically adhering robot of FIG. 1.

A magnetically adhering robot generally identified by reference numeral 10, will now be described with reference to FIG. 1 through FIG. 7.
Structure and Relationship of Parts:

Referring to FIG. 1 and FIG. 2, magnetically adhering robot 10 has a body 12. A first travelling assembly 14 is provided which is configured to move body 12 in a first direction, as indicated by arrow 16. A second travelling assembly 18 is provided which is configured to move body 12 in a second direction, as indicated by arrow 20. Second direction 20 is orthogonal to first direction 16. Referring to FIG. 3, first travelling assembly 14 has a first pair of endless tracks 22 and second travelling assembly 18 has a second pair of endless tracks 24. It will be appreciated that first pair of endless tracks 22 and second pair of endless tracks 24 could be removed and first travelling assembly 14 and second travelling assembly 18 could function equally well on supporting wheels (not shown).

Figure 4:
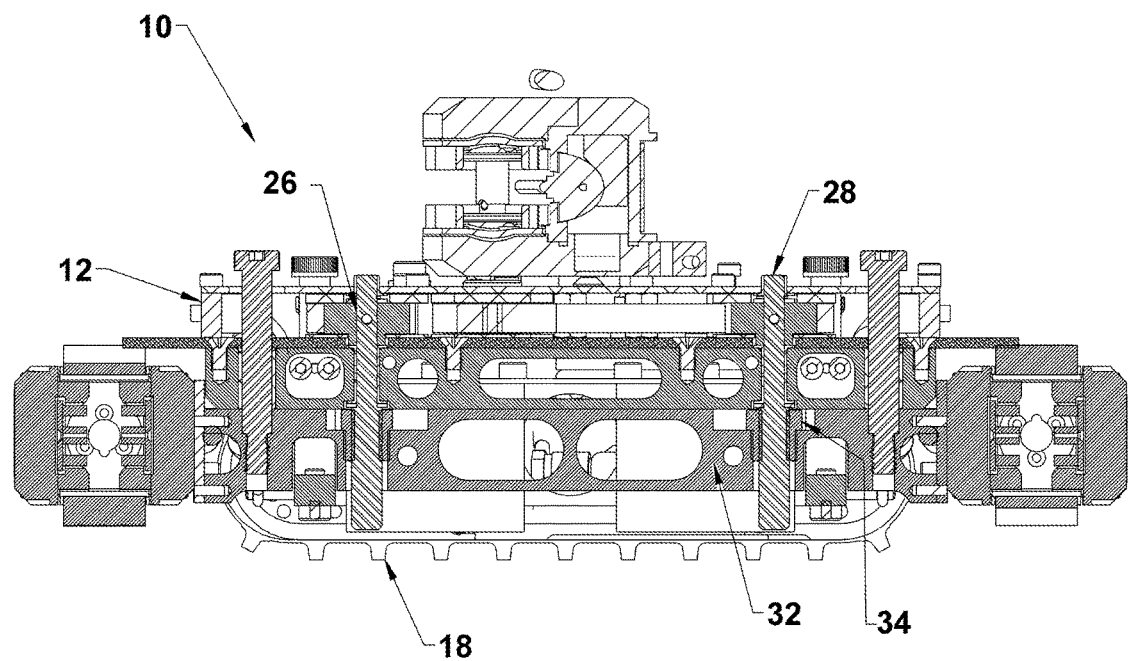
FIG. 4 is a front elevation view, in section, of the magnetically adhering robot taken along section lines 4-4 of FIG. 2.

It will be understood that body 12 is supported by either first travelling assembly 14, as shown in FIG. 1 or second travelling assembly 18, as shown in FIG. 2. Movement of body 12 is not initiated through first travelling assembly 14 and second travelling assembly 18 at the same time. Referring to FIG. 4, in order to change from first travelling assembly 14 to second travelling assembly 18, an elevator assembly is provided, generally identified by reference numeral 26. Elevator assembly 26 moves second travelling assembly 18 between a raised position, illustrated in FIG. 1, and a lowered position, illustrated in FIG. 2. Referring to FIG. 2, in the lowered position second travelling assembly 18 is lower than first travelling assembly 14 and second travelling assembly 18 solely supports body 12, with first travelling assembly 14 being lifted off of the metallic travel surface. Referring to FIG. 1, in the raised position, second travelling assembly 18 is lifted off of the metallic travel surface and positioned above first travelling assembly 14, with first travelling assembly 14 solely supporting body 12.

Figure 7:
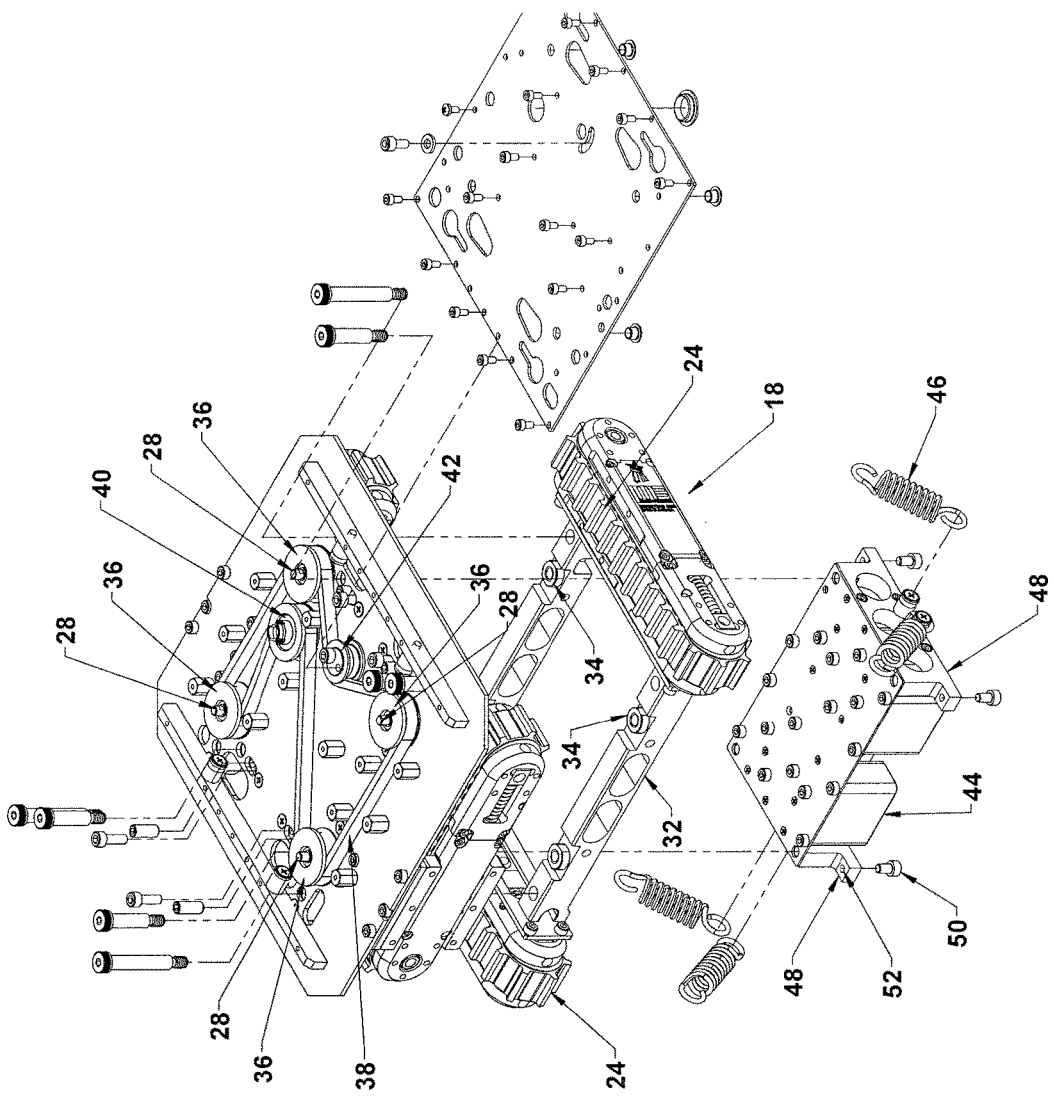
FIG. 7 is an exploded perspective view of the magnetically adhering robot of FIG. 1.

Referring to FIG. 4, elevator assembly 26 includes rotating shafts 28 with an external thread profile. Although only two rotating shafts 28 are visible in this view, there are four shafts. Referring to FIG. 7, a travelling frame 32 is provided which serves as a support structure for second travelling assembly 18. Travelling frame 32 has bores 34 with an internal thread profile that engages the external thread profile of each of rotating shafts 28. Although only three bores 34 are visible in this view, it will be appreciated that there are four bores 34, one for each of rotating shafts 28. It will be understood that travelling frame 32 travels along rotating shafts 28 in a first direction relative to body 12 in response to clockwise rotation of the rotating shafts 28 and travels along rotating shafts 28 in a second direction relative to body 12 in response to counter clockwise rotation of rotating shafts 28. Referring to FIG. 7, the drive system of selectively imparting clockwise or counter clockwise rotation to rotating shafts 28 includes pulleys 36 fixed to each rotating shafts. A drive belt 38 connects each of pulleys 36 to create rotating in either a clockwise or counter clockwise direction. Drive belt 38 engages two additional pulleys, a drive pulley 40 and a tensioning pulley 42. Drive pulley 40 is rotated by a reversible motor (not shown), which provides movement to drive belt 38. Tensioning pulley 42 is provided to keep drive belt 38 in tension.

Figure 5:
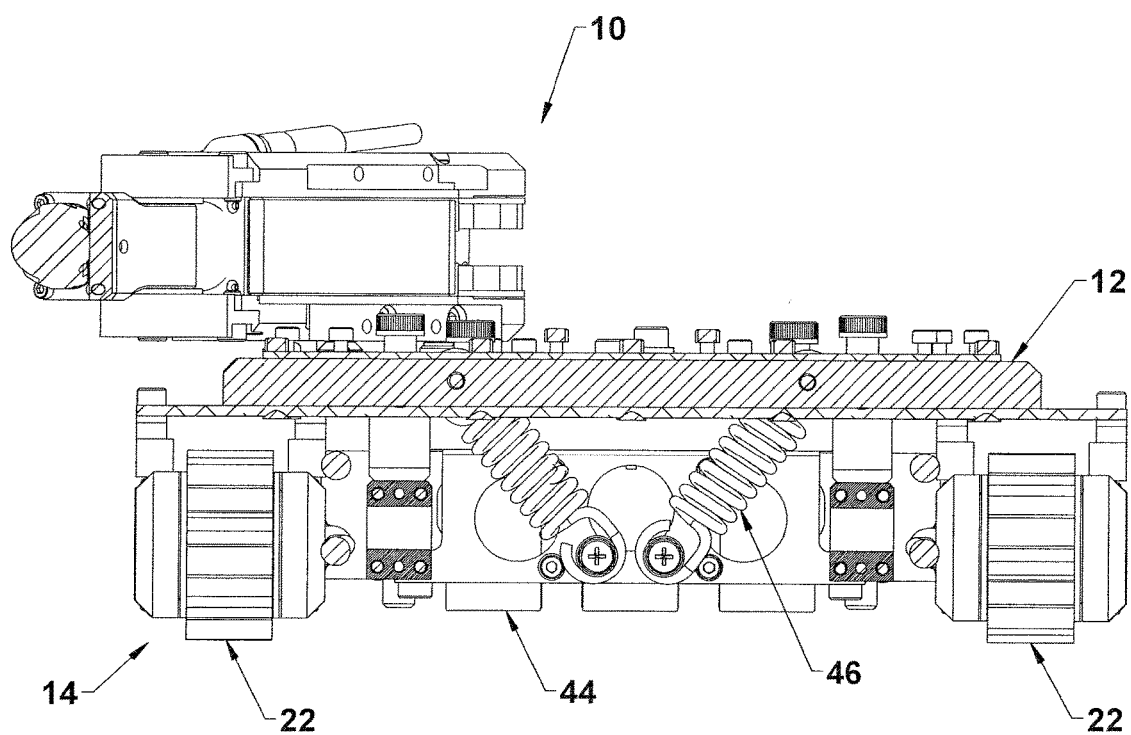
FIG. 5 is a front elevation view, in section, of the magnetically adhering robot taken along section lines 5-5 of FIG. 1

Referring to FIG. 3, a magnetic assembly 44 is provided for magnetically adhering body 12 to a metallic travel surface. Without magnetic assembly 44, robot 10 would not be a magnetically adhering robot and body 12 would fall from a vertical, inverted or rounded surface. Although two magnetic assemblies could be provided, one for each of first travelling assembly 14 and second travelling assembly 18; in order to reduce the size and weight of magnetically adhering robot 10 it is preferred that there is a single magnetic assembly. When a magnetic assembly is used, there is a finite range which provides the optimum magnetic spacing. For this reason, magnetic assembly 44 must have a first position when first travelling assembly 14 is engaged and a second position when second travelling assembly 18 is engaged. Referring to FIG. 5, magnetic assembly 44 is biased by springs 46 into the first position. Although only two springs 46 are visible in this view, four springs 46 have been provided, as illustrated in FIG. 7. Magnetic assembly 44 assumes the first position illustrated in FIG. 5 to adhere body 12 to a metal travel surface when first travelling assembly 14 solely supports body 12.

Figure 6:
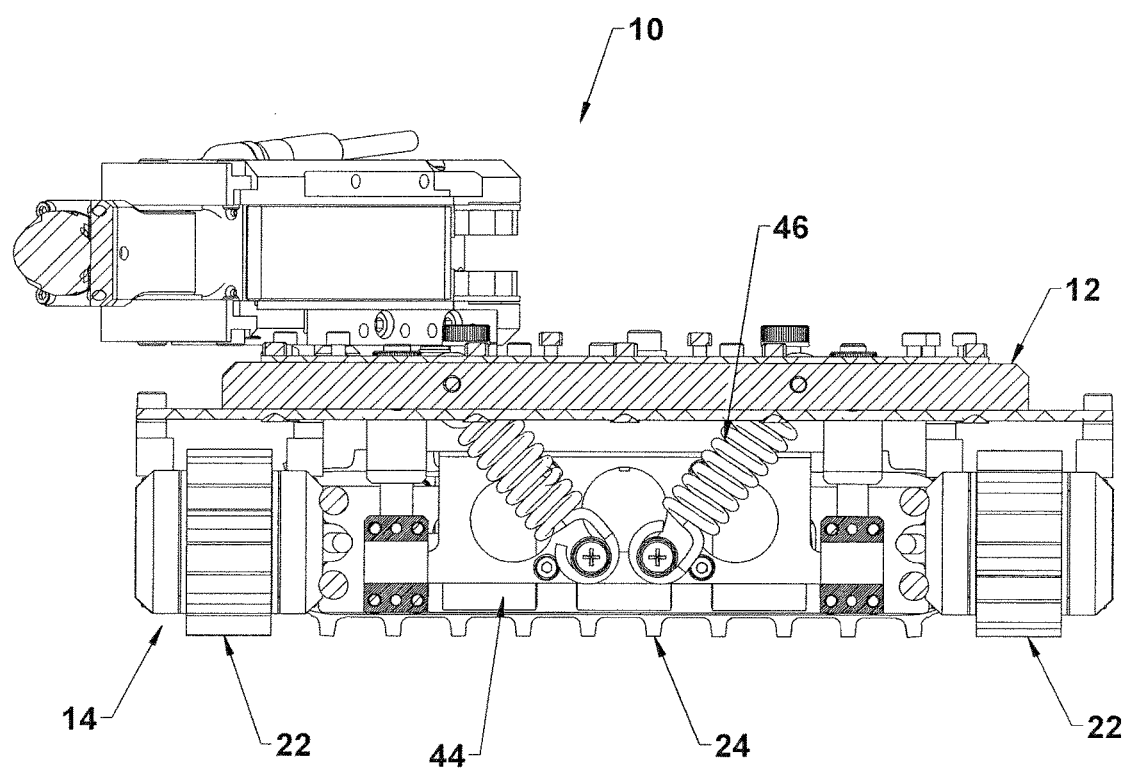
FIG. 6 is a front elevation view, in section, of the magnetically adhering robot taken along section lines 6-6 of FIG. 2

Referring to FIG. 6, magnetic assembly 44 assumes the second position to adhere body 12 to the metal travel surface when second travelling assembly 18 solely supports body 12. In order to do this, the biasing force is exerted upon magnetic assembly 44 by springs 46 must be overcome. Referring to FIG. 7, magnetic assembly 44 fits within travelling frame 32 and has feet 48 which outwardly extending from magnetic assembly 44. Optionally, screws 50 may be extended through openings 52 in feet 48 to secure magnetic assembly 44 to travelling frame 32. When second travelling assembly 18 is lowered by elevator assembly 26, second travelling assembly 18 exerts a force upon feet 48 to push magnetic assembly 44 downwardly, thereby overcoming the biasing force of springs 46 to move magnetic assembly 44 into the second position.

Operation:

Referring to FIG. 1, first pair of endless tracks 22 of first travelling assembly 14 move body 12 in a first direction, as indicated by arrow 16. Referring to FIG. 3, magnetic assembly 44 is spaced to magnetically adhere body 12 to a metallic travel surface.

Referring to FIG. 2, when it is desired to move robot 10 in direction 20, second travelling assembly 18 is lowered so that second travelling assembly 18 solely supports body 12, with first travelling assembly 14 being lifted off of the metallic travel surface. Referring to FIG. 4, the movement of second travelling assembly 18 is effected by elevator assembly 26. Referring to FIG. 7, drive motor (not shown) is activated to initiate rotation of drive pulley 40. As drive pulley 40 rotates, drive belt 38 causes each of pulleys 36 to impart either a clockwise or counter clockwise rotation to rotating shafts 28. Each rotating shafts 28 has an external thread profile that interacts with the internal thread profile of bores 34 of travelling frame 32, resulting in travelling frame 32 travelling down rotating shafts 28 to the position illustrated in FIG. 2.

Referring to FIG. 6, when second travelling assembly 18 is placed in position, the position of magnetic assembly 44 must be altered, or body 12 will lose magnetic connection with the metallic travel surface. In order to do this, the biasing force exerted upon magnetic assembly 44 by springs 46 must be overcome. When second travelling assembly 18 is lowered by elevator assembly 26, second travelling assembly 18 exerts a force upon feet 48 to push magnetic assembly 44 downwardly, thereby overcoming the biasing force of springs 46 to move magnetic assembly 44 into the second position.

Referring to FIG. 1, when it is desired to again move body 12 in first direction 16, movement of second travelling assembly 18 is against effected by elevator assembly 26. Referring to FIG. 7, drive motor (not shown) is activated to initiate rotation of drive pulley 40. As drive pulley 40 rotates, drive belt 38 causes each of pulleys 36 to impart either a clockwise or counter clockwise rotation of rotating shafts 28. Each rotating shafts 28 has an external thread profile that interacts with the internal thread profile of bores 34 of travelling frame 32, resulting in travelling frame 32 travelling back up rotating shafts 28 to the position illustrated in FIG. 1. Referring to FIG. 5, with the force exerted by travelling frame 32 removed, the biasing force of springs 46 draws magnetic assembly 44 back into the first position that has suitable magnetic spacing for use with first travelling assembly 14.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A magnetically adhering robot, comprising:
   a body;

a first travelling assembly on the body comprised of a first pair of spaced apart surface engaging elements oriented in a first direction;
a second travelling assembly on the body comprised of a second pair of spaced apart surface engaging elements oriented in a second direction, orthogonal to the first direction;
an elevator assembly which moves the second travelling assembly between a raised position and a lowered position, in the lowered position the second travelling assembly is lower than the first travelling assembly and solely supports the body, in the raised position the second travelling assembly is above the first travelling assembly with the first travelling assembly solely supporting the body; and
at least one magnetic assembly for magnetically adhering the body to a metal surface, and the at least one magnetic assembly being centrally positioned between the first pair of spaced apart surface engaging elements of the first travelling assembly and the second pair of spaced apart surface engaging elements of the second travelling assembly.

2. The magnetically adhering robot of claim 1, wherein there is a single magnetic assembly having a first position and a second position, the single magnetic assembly assuming the first position to adhere the body to the metal surface when the first travelling assembly solely supports the body, the single magnetic assembly assuming the second position to adhere the body to the metal surface when the second travelling assembly solely supports the body.

3. The magnetically adhering robot of claim 2, wherein a biasing force is exerted upon the single magnetic assembly by springs to maintain the single magnetic assembly in the first position and, as the second travelling assembly is lowered by the elevator assembly, the second travelling assembly engages the single magnetic assembly overcoming the biasing force of the springs to draw the single magnetic assembly into the second position.

4. The magnetically adhering robot of claim 1, wherein the elevator assembly is comprised of:
at least one shaft with an external thread profile, the at least one shaft being mounted for rotation;
a travelling frame having at least one bore with an internal thread profile that engages the external thread profile of the at least one shaft, such that the travelling frame travels along the at least one shaft in a first direction in response to clockwise rotation of the at least one shaft and travels along the at least one shaft in a second direction in response to counter clockwise rotation of the at least one shaft;
a drive for selectively imparting clockwise or counter clockwise rotation to the at least one shaft.

* * * * *